INVENTOR.
MARVIN K. NEWMAN

United States Patent Office 3,422,958
Patented Jan. 21, 1969

3,422,958
PRECOAT FILTER
Marvin K. Newman, Southfield, Mich., assignor to Ajem Laboratories Inc., Livonia, Mich.
Filed Sept. 26, 1967, Ser. No. 670,738
U.S. Cl. 210—333       4 Claims
Int. Cl. B01d 25/00, 27/00, 29/00

ABSTRACT OF THE DISCLOSURE

This disclosure is directed to an improved precoat filter of the type having a vessel with a septum plate dividing it into lower and upper chambers with filter tubes depending from the septum plate into the lower chamber. The improvement resides in the construction of the filter tubes each of which has a rigid supporting member having perforations in its wall with grooves connecting adjacent perforations, a flexible covering having interlocking strands at right angles to each other, and an O-ring seal for holding the sleeve on the supporting member and sealing the joint between the tube and septum plate.

---

The present invention relates to filters and more particularly to improvements in filters of the type known as "precoat" filters in which a porous filter surface is initially coated with a fine particulate material to form the filter medium.

Precoat filters have heretofore been proposed in which the filter is in the form of a plurality of tubes depending into a fluid to be filtered and through which the fluid flows either by application of pressure in the exterior of, by the application of a partial vacuum at the interior of the tubes, or a combination of both. Such a precoat filter is shown and described in the United States Letters Patent to R. B. Hobson, Jr., No. 3,100,190, issued August 6, 1963, and entitled Pressure Filter and Filter Tube Therefor. This patent discloses a tank having a septum plate which divides it into lower and upper chambers, respectively. Filter tubes depend from the septum plate into the lower chamber and on which a coating of a fine particulate material is initially deposited to form a filter medium for separating solids from the liquid. Each of the tubes is illustrated in the form of a helical spring with a flexible covering surrounding the spring. Pressure applied to the lower chamber causes liquid to flow through the precoated filtering material and flexible covering into the interior of the tubes and then from the upper chamber through an outlet conduit. In the patented construction the covering of the tube comprises wire braided helically from the top to the bottom of the tube.

To initiate operation of the patented filter a slurry of the precoat material in a carrier, such as water, is first run through the filter to build-up a coating on the exterior surface of the tubes. After a layer of predetermined thickness has been deposited to produce the desired porosity, the liquid to be filtered is introduced into the lower chamber under pressure. The filtering operation continues until the pressure required to force liquid through the filter becomes excessive at which time the filtering operation is stopped and the precoat layer and filter cake thereon are removed by shaking the tubes.

Such precoat filters are inadequate for many filtering systems because of their irregular performance. This results from the inability of the sleeves of the tubes to produce a uniform deposition of precoat material, the tendency of the precoat medium to adhere tightly to the sleeve and prevent removal, unpredictable flow characteristics through the tubes and limited filtering capacity, among other factors.

One of the objects of the present invention is to provide an improved precoat filter of the type indicated which produces a more uniform precoat thereon of regular porosity throughout its entire surface to produce a balance in flow rate and which will pass liquid at an increased rate with greater filtering capabilities than those previously used.

Another object is to provide an improved filter of the type indicated which passes only minute quantities of the precoat filter medium, produces a high retention of solids and prevents movement of adjacent tubes toward each other to avoid bridging between adjacent tubes.

Another object is to provide a filter of the type indicated which facilitates removal of the precoat and filter cake accumulated thereon.

Still another object is to provide a filter of the type indicated which is of simple and compact construction, economical to manufacture and one which is reliable in operation to separate solids from liquids.

These and other objects will become more apparent from the following description and drawings in which like reference characters denote like parts throughout the several views. It is to be expressly understood, however, that the drawings are for the purpose of illustration only, and are not a definition of the limits of the invention, reference being had for this purpose to the appended claims.

Figure 1:
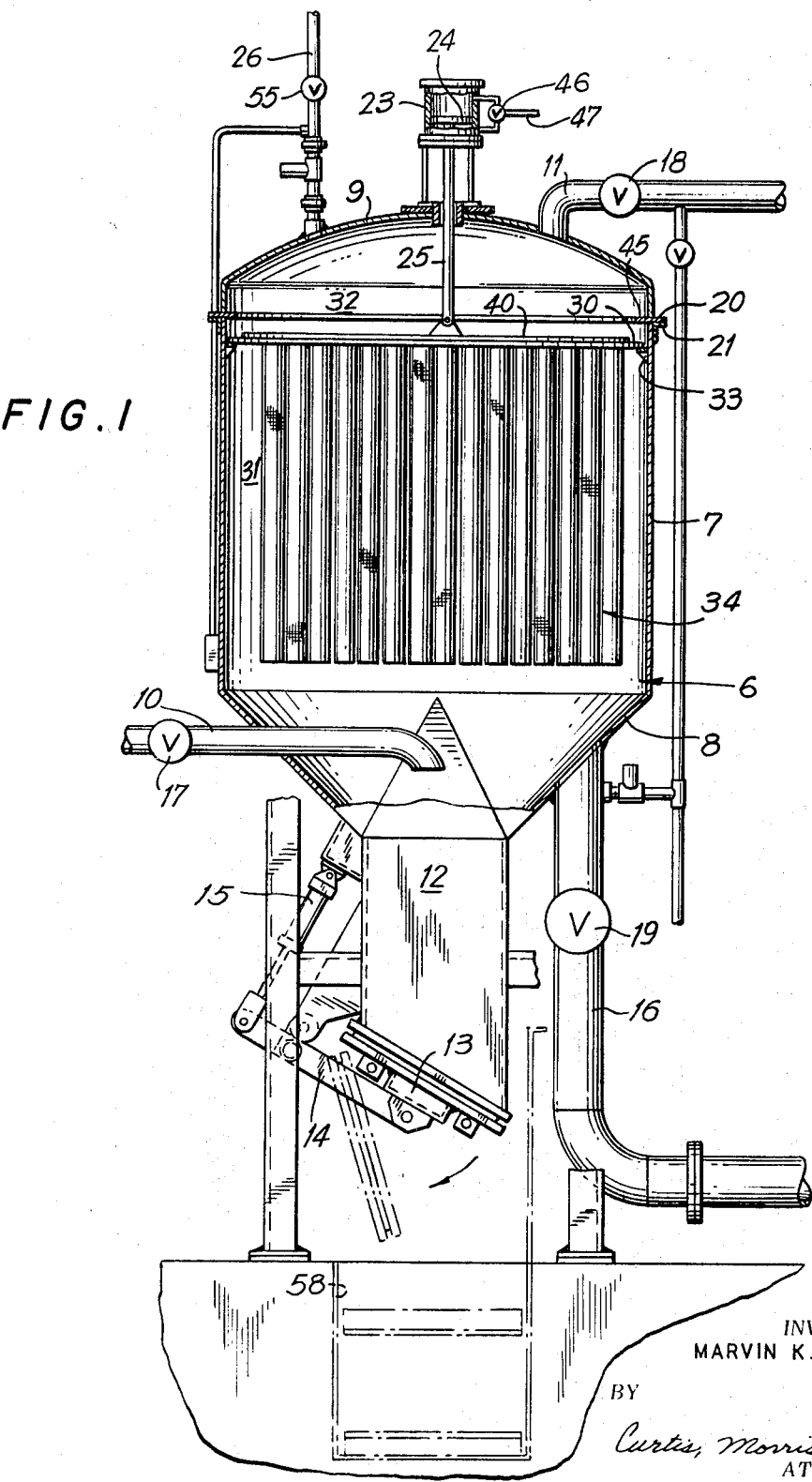
FIGURE 1 is a sectional view of a filter vessel in side elevation and showing the construction and arrangement of elements of a precoat filter to which the present invention is applied.

Referring now to FIGURE 1 of the drawings, the filter is shown as comprising a vessel 6 having a cylindrical side wall 7 and conical bottom wall 8 with a dome shaped cover 9 for closing the open top of the vessel. The conical bottom wall 8 has an inlet pipe 10 sealed therein with its inner end pointed downwardly to reduce turbulence above the pipe. An outlet pipe 11 is provided in the cover 9 through which filtered liquid flows from the filter. The lowest end of the conical wall 8 terminates in a discharge conduit 12 through which filtered solids are discharged from the filter. The discharge conduit 12 is normally closed by a valve 13 mounted on one end of an actuating lever 14. Lever 14 is pivoted intermediate its ends and actuated by a hydraulic ram 15. A drain pipe 16 also is connected to the conical bottom wall 8 and the inlet, outlet and drain pipes 10, 11 and 16 have control valves 17, 18 and 19, respectively.

The cover 9 has an outwardly projecting peripheral flange 20 which overlies a correspondingly shaped flange 21 at the upper edge of the cylinder wall 7 of the vessel 6 and the two flanges are connected by bolts 22 to connect the cover to the vessel. Cover 9 also mounts another hydraulic ram having a cylinder 23 and a piston 24 therein for actuating a piston rod 25 through the cover. In addition, a conduit 26 is connected to the cover 9 for supplying a fluid, either hydraulic or pneumatic, to the vessel.

Figure 2:
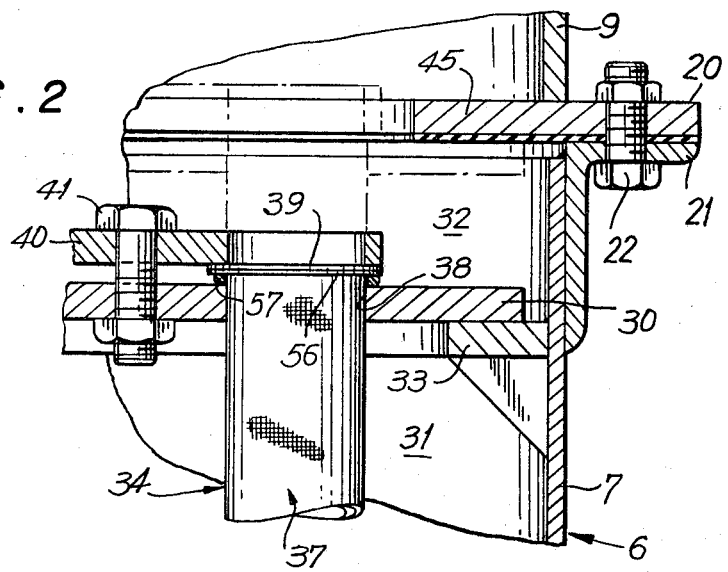
FIGURE 2 is an enlarged view of a portion of the filter vessel to show the construction of the septum plate on which the filter tubes are mounted and its arrangement in the filter vessel.

A septum plate 30 extends across the vessel 6 and divides it into a lower chamber 31 and an upper chamber 32. The peripheral edge of septum plate 30 overlies an annular flange or rim 33 projecting inwardly from the cylindrical wall 7 of the vessel 6 adjacent its upper edge as shown in deail in FIGURE 2. Septum plate 30 mounts a plurality of filter tubes 34 which depend into the lower chamber 31 as shown in FIGURE 1. Each of the tubes 34 comprises a rigid cylindrical supporting base member 35 and a flexible fabric covering 37. Each of the tubes 34 extends through a hole 38 in the septum plate 30 and the upper edge of the rigid base member 35 has an annular flange 39 which is clamped between the septum plate and a hold down plate 40 attached to the septum plate by suitable fasteners 41. The assembly of septum plate 30, hold down plate 40 and tubes 34 are held in its lowermost position by the piston rod 25 of the hydraulic ram on the cover which is attached to the assembly and presses the peripheral edge of the septum plate into sealing engagement with the annular flange 33 in the vessel 6.

A second annular flange 45 is provided on the cover 9 of the vessel 6 which projects inwardly in vertical spaced relation to the flange 33 and overlies the peripheral edge of the hold down plate 40 of the assembly. A valve 46 is provided in the line 47 for supplying hydraulic fluid to the cylinder 23 at opposite sides of the piston 24 for reciprocating the assembly between the flanges 33 and 45, alternately, in rapid succession.

Figure 3:
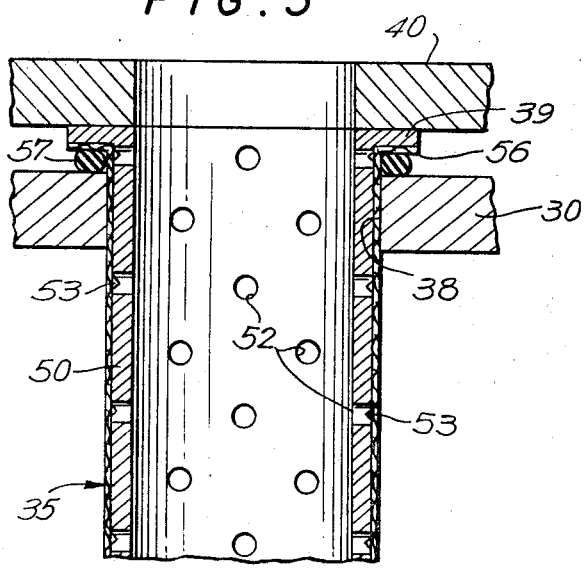
FIGURE 3 is an enlarged view of one of the filter tubes partly in section to show the grooved construction of the rigid supporting member to increase its capacity and the manner of sealing the tube support and flexible covering to the septum plate.

In accordance with the present invention, each tube 34 comprises a rigid supporting member 35 and a flexible covering 37 overlying the base member, as stated above, and the base member has a cylindrical side wall 50 and bottom wall 51 as shown most clearly in FIGURE 3. The side wall 50, bottom wall 51 and supporting flange 39 are preferably formed as an integral part of the rigid supporting member 35.

The rigid base supporting member 35 may be composed of any suitable rigid material for the particular medium to be filtered, such as steel or aluminum, when used in a non-corrosive environment, or may be made of stainless steel alloys or a suitable plastic material. The side wall 50 of the supporting member 35 has a series of circular holes 52 arranged in a regular pattern around its periphery. For example, rigid supporting member 34 may be composed of stainless steel 60 inches long, 2 inches in diameter and with a wall thickness of 0.125 inch. The holes 52 in the sides of the tube may be from 0.125 to 0.250 inch in diameter. One feature of the present invention is the provision of grooves 53 in the outer peripheral surface of the side wall 50 of the rigid supporting member 35 which extends between adjacent holes 52. These grooves may be 1/16 of an inch wide and a V shape in cross-section and provide paths of flow for liquid passing through the flexible covering 37 to increase the capacity of the filtering tube 34.

Figure 4:
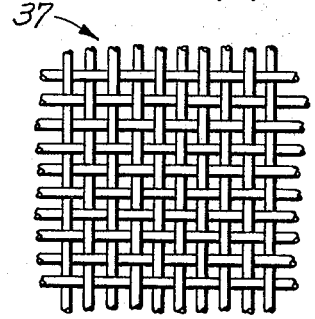
FIGURE 4 is a further enlarged view of a portion of the flexible covering and showing the vertical arrangement of certain of the strands and the right angular arrangement of other interlacing strands.
Figure 5:
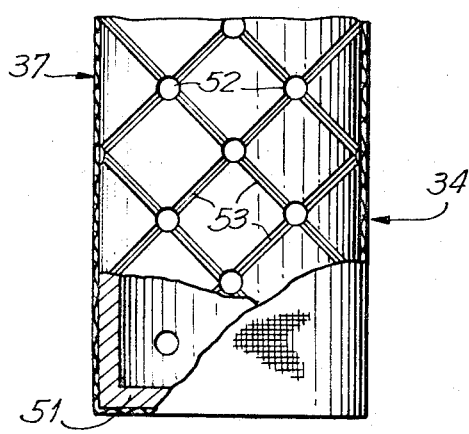
FIGURE 5 is a view similar to FIGURE 4 showing a flexible tube covering of modified construction in which at least one series of strands are woven in pairs.

The flexible covering 37 comprises stainless steel screen or a woven fabric of a suitable material such as synthetic plastics which are resistant to the material being filtered. The strands, of the covering, either metallic or plastic, may be as small as 0.002 of an inch in diameter and as large as 0.125 inch depending upon the mesh of the filter required for the particular liquid to be filtered and precoat material used. Preferably, the strands are monofilaments of a plastic which may be woven in the manner illustrated in FIGURE 4 with fill strands alternating over and under the warp strands. It is important, in accordance with the present invention, that the warp and fill strands be at substantially right angles to each other with at least some of the strands extending parallel to the axis of the tube and other strands at right angles thereto. It has been found that this type of weave insures a uniform precoat throughout the length of the tube wtih a minimum loss of precoat material to produce a filter surface of balanced porosity over the entire periphery of the tube. Various weaves may be used with good results for the particular conditions, such as the one illustrated in FIGURE 5 in which each fill strand alternately passes under and over two adjacent warp strands for each pick of the shuttle.

The flexible fabric covering 37 of metal or plastic closely fits side wall 50 and bottom wall 51 of the rigid supporting base 35 and has an outward fold like a radial flange 56 at its upper edge which overlies the flange 39 of the supporting base. An O-ring 57 is provided between the septum plate 30 and under side of the flanges 56 and 39 of the flexible covering 37 and rigid supporting member 34, respectively. The O-ring 57 for each tube 34 performs the double function of holding the flexible covering 37 in position on the rigid supporting member 35 and sealing the joint between the septum plate 30 and rigid supporting member to prevent any leakage of unfiltered fluid around a tube 34 from the bottom chamber 31 to the upper chamber 32. One form of the invention having now been described in detail, the mode of opertaion is next explained.

With the parts in the position illustrated in FIGURE 1, a filtering operation is initiated by introducing a slurry of a liquid and precoat material, such as fullers earth, into the lower chamber 31 through the inlet pipe 10. The liquid of the slurry under pressure in the chamber 31 then passes through the interstices between adjacent strands of the flexible fabric covering 37 and the grains of precoat material are filtered out of the slurry and deposited on the surface of the covering. The precoat layer so formed on the covering 37 of each tube 34 then forms a cylindrical filter at the exterior of the tubes of a particular porosity depending upon the thickness of the layer. It has been found that with woven fabric covering 37, of the present invention, a precoat layer is laid uniformly on its surface with a minimum loss of the precoat medium to produce a filter of substantially uniform porosity throughout its length. The liquid flowing through the flexible covering 37 then enters grooves 53 in the outer periphery of the rigid base member which directs it to the circular holes 52 and into the interior of the tubes 34. The liquid then flows into the upper chamber 32 of the filter and is discharged through the outlet pipe 11.

After a precoat layer has been laid on the surface of each tube 34, the supply of precoat slurry is stopped and the medium to be filtered is introduced into the lower chamber 31 through the inlet pipe 10. The downwardly directed end of inlet pipe 10 reduces turbulence to a minimum around the tubes 34 and the liquid then passes through the precoat layer of filter medium which filters out the solids in the same way as explained with respect to the precoated slurry. The solids then accumulate on the surface of the precoat layer and build up as an additional layer which, in itself, acts as an additional filter and increases the resistance to flow of liquid therethrough.

Due to the rigid base supporting member 35, the tubes 34 are prevented from swinging during a filtering operation so that no contact of adjacent tubes can occur and all bridging of filter cakes is avoided. Also, due to the rigid base supporting member 35 no strain or cracking of the filter cake occurs which would produce irregular flow at different sections of the tube. Instead a uniform porosity exists throughout the length of each tube and between adjacent tubes to produce a thorough filtering of all liquid and produce a balanced flow rate throughout all areas of the filter. Furthermore, the grooved construction of the supporting members 35 permit increased flow of filtered liquid away from the covering 37 to increase the capacity of the filter.

The filter of the present invention has many applications such as filtering oil, removing impurities from other liquids, in general, and the purification of water. In one particular application, the filter of the present invention has been used to remove contaminates from the liquid of a wet type air washer serving cupola furnaces before the gases are exhausted to the atmosphere. For this purpose, gases are passed through a curtain of water which removes all solid particles from the gas after which the water is passed through the filter. It has been found that the water filtered by the present filter in such an installation has less than one part per million of suspended solids.

When the resistance to the flow of liquid through the tubes 34 increases to a certain value, the filtering operation is switched to an alternate filter and the first filter is cleaned. To this end, the supply of liquid to be filtered is stopped by closing the valve 17 in the inlet pipe 10 and valve 46 for the hydraulic ram on cover 9 is operated to rapidly reverse the supply of motive fluid to opposite sides of the piston 24. Such operation of the valve 46 rapidly reciprocates the piston rod 25 and assembly of septum plate 30 and hold down plate 40 to vigorously shake the tubes 34. In addition to shaking tubes 34, the assembly is continuously bumped as the outer peripheries of the septum and hold down plates 30 and 40 engage the annular flanges or rims 33 and 45 projecting inwardly from the sides of the vessel 6 and cover 9. This bumping and shaking of the tubes 34 causes the accumulated filter cake and precoat to break up and drop off the outer surface of the flexible covering 37. Also, the reciprocation of the septum plate assembly with the valve 18 in the outlet pipe 11 closed will cause the filtered liquid in chamber 32 to alternately flow into and out of tubes 37. This liquid under pressure flows through the holes 52 in the rigid supporting member 35 and flexes the covering 37 to further promote the removal of filter cake therefrom.

It has been found that applicant's tube construction of a rigid supporting member 35 and flexible fabric covering 37 facilitates the removal of filter cake as well as providing a uniform coating of precoat thereon. When required, the upper chamber 32 may be subjected to repeated pulses of hydraulic or pneumatic fluid on the interior of the tubes 34 by closing the inlet valve 17, opening the drain valve 19 and alternately opening and closing of the valve 55 in the line 47 to the cover 9. Such pulsing of a high pressure fluid in the upper chamber 32 tends to flex the fabric covering 37 in addition to shaking it.

The filter cake removed from the tubes 34 then falls by gravity and is guided by the conical bottom wall 8 into the discharge conduit 12 as it settles out of the liquid. The removed filter cake and precoat material may be dumped from the filter by operating the hydraulic ram 15 which, operating through the lever 14, opens the valve 13 to dump the material into a trough 58. After a cleaning operation the filter is ready for another filtering operation which may be performed as explained above.

It will now be observed that the present invention provides an improved filter for producing a more uniform precoat on the periphery of filter tubes throughout its entire surface. It will also be observed that the present invention provides a filter which produces a more uniform flow of liquid through the filter at a faster rate without movement of the tubes toward and away from each other. It will also be observed that the filter facilitates the removal of the filter cake and precoat thereon. It will also be observed that the present invention provides an improved filter of a simple and compact construction adapted for economical manufacture and one which is reliable in operation.

While a single embodiment of the invention is herein illustrated and described, it will be understood that changes may be made in the construction and arrangement of the elements without departing from the spirit or scope of the invention. Therefore without limitation in this respect the invention is defined by the following claims.

I claim:
1. A precoat filter comprising a vessel having an inlet connection adjacent the bottom and an outlet connection adjacent the top, a septum plate across said vessel between said inlet and outlet connections to divide the vessel into a lower chamber and an upper chamber, the septum plate having a series of adjacent holes, porous tubes each having a closed bottom, an open top, an annular flange projecting radially from its upper end and spaced perforations in its cylindrical wall, each tube extending through a hole in the septum plate with its annular flange overlying the septum plate around the hole, a flexible covering sleeve overlying the outer surface of each of said tubes and sealed to the septum plate to adapt it to receive a coat of particulate material to provide a filter surface thereon, said flexible covering sleeve being composed of woven strands with at least some of the interlacing strands extending parallel to the axis of the tube and other interlacing strands extending at right angles to the first mentioned strands, a holding plate overlying the septum plate and having a hole in alignment with the interior of each tube, the upper end of the covering sleeve for each tube overlying its annular flange, an O-ring between the septum plate and an edge of the sleeve to hold the sleeve in position at the top and seal the joint between the tube and the septum plate, and each of the tubes having grooves in its outer surface extending between adjacent perforations.

2. A precoat filter in accordance with claim 1 in which the vessel has an annular rim projecting inwardly from its periphery, the peripheral edge of the septum plate seating on said rim, a rod projecting from said septum plate, and a hydraulic ram for actuating said rod to hold the septum plate in sealing engagement with said rim.

3. A precoat filter in accordance with claim 2 in which a second annular rim is provided on the inner periphery of said vessel in vertical spaced relation to the first rim, valve means for reversing the supply of motive fluid to the hydraulic ram to reciprocate the septum plate and tubes depending therefrom between the annular rims on said vessel to shake filter cake and precoat from the surface of the tubes, a discharge opening in the bottom of the vessel, and valve means for opening and closing the discharge opening.

4. A precoat filter in accordance with claim 3 in which a pipeline is connected to the top of said vessel for supplying a motive fluid under pressure directly into the chamber above the tubes, and valve means in said pipeline for opening and closing the line to supply motive fluid to the interior of the tubes in successive pulses to remove the filter cake and precoat from the periphery of the tubes.

References Cited

UNITED STATES PATENTS

| | | | |
|---|---|---|---|
| 2,551,175 | 5/1951 | Smith | 210—489 |
| 2,633,729 | 4/1953 | Slaughter | 210—497 X |
| 2,826,308 | 3/1958 | Koupal | 210—333 X |
| 3,100,190 | 8/1963 | Hobson | 210—332 X |
| 3,262,568 | 7/1966 | Zehrbach | 210—332 X |

REUBEN FRIEDMAN, *Primary Examiner.*

J. L. DE CESARE, *Assistant Examiner.*

U.S. Cl. X.R.

210—457, 499